No. 625,627.  
Patented May 23, 1899.

S. E. WOODY.
STEREOPTICON.
(Application filed Apr. 8, 1898.)

(No Model.)  
2 Sheets—Sheet 1.

WITNESSES:  
Donn Twitchell  
Geo. J. Hosted

INVENTOR  
S. E. Woody  
BY  
ATTORNEYS.

No. 625,627. Patented May 23, 1899.
S. E. WOODY.
STEREOPTICON.
(Application filed Apr. 8, 1898.)
(No Model.) 2 Sheets—Sheet 2.

WITNESSES:
Donn Twitchell

INVENTOR
S. E. Woody
BY
ATTORNEYS.

THE NORRIS PETERS CO., PHOTO-LITHO., WASHINGTON, D. C.

UNITED STATES PATENT OFFICE.

SAMUEL ELISHA WOODY, OF LOUISVILLE, KENTUCKY.

STEREOPTICON.

SPECIFICATION forming part of Letters Patent No. 625,627, dated May 23, 1899.

Application filed April 8, 1898. Serial No. 676,908. (No model.)

*To all whom it may concern:*

Be it known that I, SAMUEL ELISHA WOODY, of Louisville, in the county of Jefferson and State of Kentucky, have invented a new and Improved Stereopticon, of which the following is a full, clear, and exact description.

The invention relates to multiple dissolving-view lanterns; and its object is to provide a new and improved stereopticon which is simple and durable in construction, very effective in operation, and arranged to refract the light in such a manner that the picture refracted from each of two optical systems appears on the same spot on the screen, thus insuring proper registration.

The invention consists of novel features and parts and combinations of the same, as will be described hereinafter and then pointed out in the claims.

Reference is to be had to the accompanying drawings, forming a part of this specification, in which similar characters of reference indicate corresponding parts in all the figures.

Figure 1:
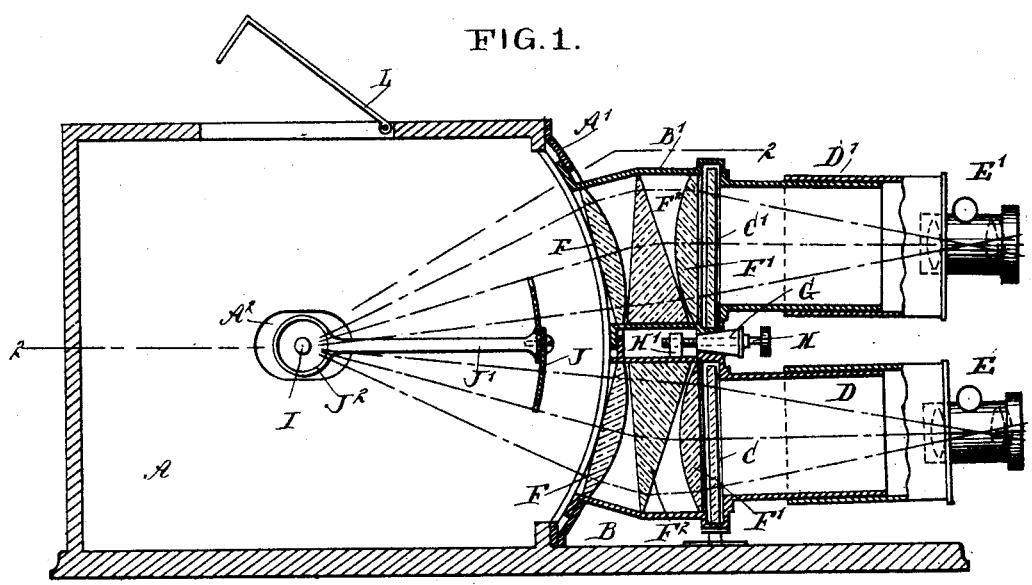
Figure 2:
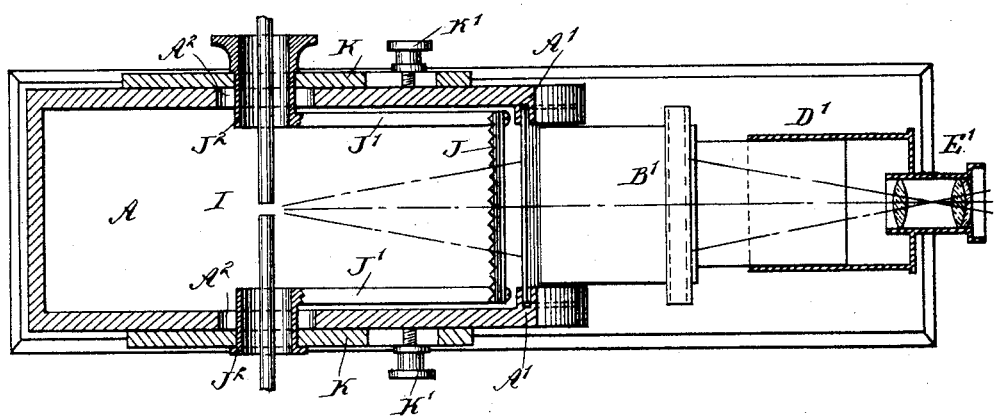
Figure 3:
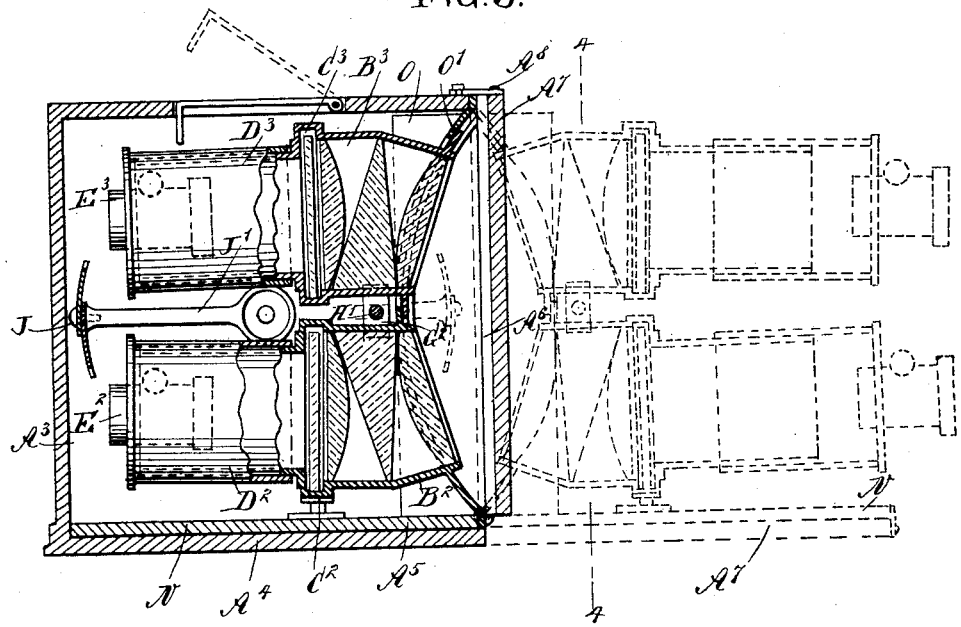
Figure 4:
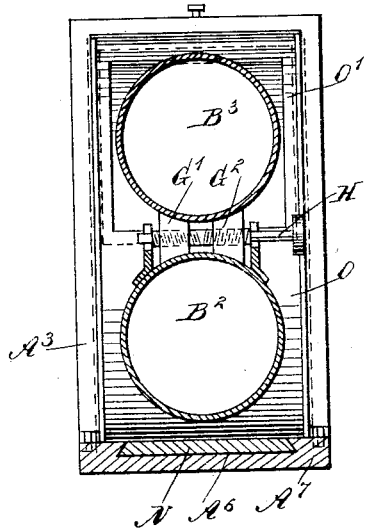

Figure 1 is a sectional side elevation of the improvement. Fig. 2 is a sectional plan view of the same on the line 2 2 of Fig. 1. Fig. 3 is a sectional side elevation of a modified form of the improvement in a folded position; and Fig. 4 is a transverse section of the same in an extended position, the section being taken on the line 4 4 of Fig. 3.

On the forward end of the light-casing A of the stereopticon are arranged two condensers B B', preferably located one above the other, the upper condenser being adjustable relatively to the lower one, as hereinafter more fully described. In front of the condensers B B' are arranged the slide-holders C C', respectively opening into the adjustable tubes D D', carrying the objective lenses E E', respectively. Each of the condensers B B' is provided with two condensing-lenses F F' of the plano-convex form, having a prism $F^2$ interposed between the two lenses F F', so that the rays of light passing to the lens F from the interior of the light-casing are refracted by the prism $F^2$ to the other lens F', adjacent to the slide-holder C or C', as indicated in the drawings. The two lenses F F' stand at an angle to each other and the interposed prism $F^2$ refracts the rays of light at a proper angle to pass through the objective and the objective lenses to the screen, thus projecting the picture on the screen.

In order to insure a proper registration of the two pictures projected by the two optical systems, I employ a wedge G, interposed between the frames for the condensers B B', and said wedge G is movable longitudinally by being held on a screw H, screwing in a nut H', carried by the fixed frame of the condenser B. The frame for the condenser B' is fitted to slide in a segmental guideway A', having its center in a light produced by a lamp of any approved construction, preferably an electric lamp, the two carbons extending into the casing through the sides thereof, as indicated in the drawings.

Now it will be seen that by the arrangement described the lens F for the condenser B' will always stand in proper relation to the center of the light when the condenser is adjusted to bring the projected picture to the same spot as the one from the lower fixed optical system to insure proper registration. It is understood that the lens F of the condenser B focuses to the center of light the same as the lens F for the condenser B'.

The shutter J for the dissolving apparatus is mounted on side arms J', attached to sleeves $J^2$, projecting through elongated apertures $A^2$, formed in the sides of the light-casing A. The outer ends of the sleeves $J^2$ are held in slides K, mounted to slide longitudinally in suitable guideways on the outside of the light-casing to permit of adjusting the carbons of the electric lamp, if necessary, the slides being securely fastened in place after adjustment by suitable clamping-screws K'. (See Fig. 2.) By turning one of the sleeves $J^2$ from the outside the shutter J can be readily moved to cut off the rays of light from one lens F to allow the rays to pass through the other optical system only and then the said shutter can be moved to cut off the light from this system, letting the rays pass through the other system for dissolving purposes. The top of the casing A is provided with a suitable heat-outlet L of any approved construction.

In the modified form shown in Figs. 3 and 4 the light-casing $A^3$ forms, in addition to its ordinary function, a receptacle for the condensers $B^2 B^3$, the slide-holders $C^2 C^3$, and the adjustable tubes $D^2 D^3$, carrying the objective lenses $E^2$ $E^3$, to insure compactness in packing and transporting the stereopticon.

The base or bottom $A^4$ of the light-casing $A^3$ is formed with a longitudinally-extending dovetail groove $A^5$, adapted to register with a similar groove $A^6$, formed in an extension $A^7$, hinged to the outer end of the bottom $A^4$ and adapted to form a cover for the open end of the casing after the several parts are stored in the light-casing, as above described, and as shown in Fig. 3. The free end of the extension or cover $A^7$ is adapted to be locked to the top of the light-casing by a suitable catch $A^8$, which when opened permits of swinging the extension down into alinement with the bottom $A^4$. In the registering grooves $A^5$ and $A^6$ is fitted to slide a similarly-shaped support N, on which the frame for the lower condenser $B^2$ is secured, the frame for the upper condenser being fitted in the guideway $O'$, carried by a frame O, likewise secured to the support N.

When it is desired to use the device, the extension is swung down, as described, and then the support N, with the parts carried thereby, is slid out of the grooves $A^5$ $A^6$, and then the support is reversed and reinserted in the groove $A^6$ and moved inward until the proper position is reached—that is, until the center of the guideway $O'$ coincides with the center of the light in the light-casing.

The adjusting device for the upper condenser $B^3$ consists of two wedges $G'$ $G^2$, interposed between the frames for the condensers $B^2$ and $B^3$ and screwing on a right and left hand screw-rod $H^2$, mounted to turn in bearings in the frame for the lower condenser $B^2$. Now it is evident that by turning the screw-rod $H^2$ the wedges $G'$ $G^2$ are simultaneously moved toward and from each other to swing the upper condenser upward or downward and bring the two optical systems in position for a proper registration of the projected picture on the screen.

The shutter J is the same as the one above described in reference to Figs. 1 and 2, and this shutter is swung rearward, as illustrated in Fig. 3, when the device is not in use and the optical systems are fitted into the light-casing for conveniently transporting the stereopticon from one place to another. The lenses and prisms in the condensers are the same as the ones previously described in reference to Figs. 1 and 2.

The objective lenses $E^2$ $E^3$ are reversed in the tubes $D^2$ $D^3$, respectively, when the systems are stored in the casing $A^3$, as indicated in Fig. 3.

From the foregoing it is evident that the rays of light from the light-casing A are refracted and not reflected, as heretofore done in apparatus of this kind, and as less light is lost by refraction of the rays by the use of prisms than by reflection by the use of mirrors a considerably-larger amount of light is obtained in this apparatus for projecting pictures on a screen, and consequently clearer views and better results in general are obtained.

I do not limit myself to the exact construction of the arrangement as described, as it is evident that the condensers, for instance, may comprise only a single lens. The condensing-lenses may be of various forms other than the plano-convex lens mentioned, the meniscus and double-convex lens being equally applicable for the purpose. Furthermore, the prisms may be placed otherwise than between the condensing-lenses—for instance, between the light and the condensing-lenses—and still perform their function of so refracting the light-rays as to register the pictures on the screen.

Having thus fully described my invention, I claim as new and desire to secure by Letters Patent—

1. A stereopticon, provided with a light-casing, two condensers, each having a lens arranged to focus to the center of the light and a prism for refracting the rays of light passing through the said lens, the said prisms so refracting the light-rays as to register the pictures from the two optical systems on the screen, substantially as shown and described.

2. A stereopticon provided with a plurality of condensers, and a prism for each condenser so placed as to refract the rays of light coming from a single illuminating-point, so that they will be focused upon the same points upon the screen, substantially as set forth.

3. A stereopticon, provided with two condensers, each having two condensing-lenses, one of said condensers being adjustable relative to the other, and prisms located between the said lenses to refract the rays of light from one lens to the other, substantially as shown and described.

4. A stereopticon, comprising a light-casing, two condensers at the end of the light-casing and adjustable relatively to each other, each condenser being provided with two condensing-lenses of plano-convex form, and standing at an angle to each other, and a prism interposed between the two lenses, substantially as shown and described.

5. A stereopticon, comprising a light-casing, two condensers at the end of the light-casing and adjustable relatively to each other, each condenser being provided with two condensing-lenses of plano-convex form, and standing at an angle to each other, a prism interposed between the two lenses, one of the condensers being fitted to slide in a segmental guideway on the light-casing, and means for adjusting this condenser relatively to the one in the said guideways, as set forth.

6. A stereopticon, comprising a light-casing, two condensers at the end of the light-casing and adjustable relatively to each other, each condenser being provided with two condensing-lenses of plano-convex form, and standing at an angle to each other, a prism interposed between the two lenses, and a shutter held movably in the light-casing between the light and the condenser-lenses, substantially as shown and described.

7. A stereopticon, provided with a light-casing, a reversible support fitted to slide in the said casing, and two optical systems carried by said support and adapted to be extended from the said casing to operate in conjunction with the light-casing, or to be stored therein when the support is removed therefrom and reversed, substantially as shown and described.

8. A stereopticon, provided with a plurality of condensers each comprising two condensing-lenses arranged at an angle to each other, and a prism interposed between the lenses where the rays of light are practically parallel, for refracting the rays of light from one lens to the other, substantially as shown and described.

9. A stereopticon, comprising a light-casing, two condensers arranged one above the other and located at the end of the light-casing, the upper condenser being adjustable relative to the lower, slide-holders arranged in front of the condensers and opening into the adjustable tubes carrying the objective lenses, each of said condensers being provided with two condensing-lenses standing at an angle to each other, and a prism interposed between the two lenses so that the rays of light passing to one lens from the interior of the light-casing are refracted by the prism to the other lens adjacent to the slide-holder, substantially as shown and described.

10. A stereopticon, comprising a light-casing, two condensers at the end of the light-casing, a prism for refracting the rays of light passing through or to the said condensers, a segmental guideway in which the frame of one of said condensers is fitted to slide, the said guideway having its center in the light in said casing, and means for adjusting the said movable condenser, substantially as shown and described.

11. A stereopticon, comprising a light-casing, two condensers at the end of the light-casing, one of said condensers being movable, prisms for refracting the rays of light, and a wedge interposed between the frames of the condensers for adjusting the said movable condenser, substantially as set forth.

SAMUEL ELISHA WOODY.

Witnesses:
  SAMUEL SIDNEY WOODY,
  JOHN P. HOUSLEY.